United States Patent
Weber et al.

(10) Patent No.: US 10,593,915 B2
(45) Date of Patent: Mar. 17, 2020

(54) BATTERY HOUSING PART FOR A TRACTION BATTERY OF AN ELECTRIC OR HYBRID VEHICLE AND BATTERY HOUSING

(71) Applicant: VOLKSWAGEN AKTIENGESELLSCHAFT, Wolfsburg (DE)

(72) Inventors: Alexandra Weber, Braunschweig (DE); Bendix Becker, Dummerstorf (DE); Florian Glaubitz, Wendeburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 15/535,091

(22) PCT Filed: Nov. 5, 2015

(86) PCT No.: PCT/EP2015/075764
§ 371 (c)(1),
(2) Date: Jun. 12, 2017

(87) PCT Pub. No.: WO2016/096236
PCT Pub. Date: Jun. 23, 2016

(65) Prior Publication Data
US 2017/0346052 A1  Nov. 30, 2017

(30) Foreign Application Priority Data

Dec. 19, 2014 (DE) .......................... 10 2014 226 597

(51) Int. Cl.
*H01M 2/00* (2006.01)
*H01M 2/10* (2006.01)
*H01M 2/02* (2006.01)

(52) U.S. Cl.
CPC ....... *H01M 2/1072* (2013.01); *H01M 2/0237* (2013.01); *H01M 2220/20* (2013.01)

(58) Field of Classification Search
CPC ...................................................... H01M 2/00
See application file for complete search history.

(56) References Cited

U.S. PATENT DOCUMENTS

| 2,427,639 A | 9/1947 | Weida |
|---|---|---|
| 9,093,698 B2 | 7/2015 | Tanaka |

(Continued)

FOREIGN PATENT DOCUMENTS

| CN | 201663183 U | 12/2010 |
|---|---|---|
| CN | 102714287 A | 10/2012 |

(Continued)

*Primary Examiner* — Jacob B Marks
(74) *Attorney, Agent, or Firm* — Laurence A. Greenberg; Werner H. Stemer; Ralph E. Locher (57) ABSTRACT

A battery housing part for a traction battery of an electric or hybrid vehicle. A first partial region of the battery housing part is composed of a plastic and at least one second partial region is composed of a material that is different therefrom. In this way, high degree of stiffness of the battery housing part can be achieved together with low weight. The second partial region that is composed of a material of a different type can be provided in a targeted manner where the at least one second partial region enables the greatest advantage in respect of the stiffness of the battery housing part. The use of a plastic for other partial regions of the battery housing part makes it possible to keep the weight of the battery housing part low.

9 Claims, 7 Drawing Sheets

(56) References Cited

U.S. PATENT DOCUMENTS

| | | | |
|---|---|---|---|
| 2012/0100414 A1 | 4/2012 | Sonta | |
| 2012/0301765 A1 | 11/2012 | Loo et al. | |
| 2013/0202940 A1* | 8/2013 | Gendlin | H01M 2/1083 429/120 |
| 2015/0380714 A1* | 12/2015 | Fink | H01M 2/202 429/121 |
| 2016/0056511 A1* | 2/2016 | Schmid | H01M 10/625 165/80.2 |
| 2016/0172726 A1 | 6/2016 | Enning et al. | |
| 2016/0197337 A1* | 7/2016 | Yau | H01M 2/1055 429/7 |

FOREIGN PATENT DOCUMENTS

| | | |
|---|---|---|
| CN | 202495497 U | 10/2012 |
| CN | 102986058 A | 3/2013 |
| CN | 203698595 U | 7/2014 |
| DE | 102006048291 A1 | 2/2008 |
| DE | 112006002637 T5 | 8/2008 |
| DE | 102009037138 A1 | 2/2011 |
| DE | 102010014905 A1 | 10/2011 |
| DE | 102011054345 A1 | 4/2012 |
| DE | 102011052513 A1 | 2/2013 |
| DE | 102011052515 A1 | 2/2013 |
| DE | 102011113112 A1 | 3/2013 |
| DE | 102012004135 A1 | 8/2013 |
| DE | 101012015448 A1 | 2/2014 |
| DE | 102012019087 A1 | 3/2014 |
| DE | 102012019922 A1 | 4/2014 |
| DE | 102013112413 A1 | 5/2014 |
| DE | 102012112063 A1 | 6/2014 |
| DE | 102013011895 A1 | 1/2015 |
| JP | S62115647 A | 5/1987 |
| WO | 2013020707 A2 | 2/2013 |
| WO | 2014166757 A1 | 10/2014 |

* cited by examiner

BATTERY HOUSING PART FOR A TRACTION BATTERY OF AN ELECTRIC OR HYBRID VEHICLE AND BATTERY HOUSING

BACKGROUND OF THE INVENTION

Field of the Invention

The present invention concerns a battery housing part for a traction battery of an electric or hybrid vehicle, and a battery housing.

DE 10 2013 112 413 A1 concerns a battery housing part for a traction battery of an electric vehicle in which the traction battery can be received, wherein the battery housing part consists of a thermoplastic or duroplastic material.

When such battery housing parts are made of plastic, in particular battery housing parts containing the traction battery or batteries, the challenge is to create adequate stiffness of the battery housing part and protect the battery from damage in the event of a crash.

SUMMARY OF THE INVENTION

In this context, the present invention is based on the object of creating a battery housing part for a traction battery of an electric or hybrid vehicle, and a battery housing, which has a high stiffness and protects the battery from damage in the event of a crash.

This object is achieved according to the invention in that the battery housing part is formed in a first partial region from a plastic and in at least one second partial region from a material different therefrom. This is consequently a hybrid component.

In this way, a high stiffness of the battery housing part can be achieved together with low weight. The high stiffness of the battery housing part effectively protects the battery—for example a high-voltage battery, also called an HV battery, with a plurality of battery modules and a plurality of battery cells—even in the event of a crash. The second partial region or partial regions made of a different type of material may be provided in a targeted fashion, where the greatest advantage can be achieved in respect of the stiffness of the battery housing part. The use of a plastic for partial regions of the battery housing part makes it possible to keep the weight of the battery housing part low despite the gain in stability.

Advantageously, such a battery housing part is used as a component of the battery housing for a traction battery of an electric or hybrid vehicle, which for example contains as a further component a housing cover or similar.

Advantageous refinements and improvements of the invention are indicated in the subclaims.

To improve the stiffness of the battery housing part and in particular to increase its stability, e.g. in the event of a crash, it is advantageous if at least on a portion of the periphery of the battery housing part, at least one reinforcing component is provided which consists of a different material from the battery housing part.

For increasing the stiffness of the battery housing part, it is particularly advantageous if the reinforcing component is configured as a frame and surrounds at least a portion of the periphery of the battery housing part in the manner of a frame.

For simple and economic production of the reinforcing component, it is advantageous if the reinforcing component is made from an extruded profile. For example, aluminum extruded profiles may be used here which in principle are available commercially and the cross-section of which can be adapted as required.

In order to hold and fix the reinforcing element easily and securely on the battery housing part, it is advantageous if the reinforcing component is held on the battery housing part by means of a mechanical connection and/or by extrusion molding.

As an alternative to a frame-like reinforcing element, but in some cases even additionally, the battery housing part may have at least one substantially flat plate element which consists of a material different from that of the battery housing part.

For example, the surfaces on which the HV battery or individual battery modules stand and are fixed may be formed by such substantially flat plate elements in the form of insert plates.

For a high stiffness of the battery housing part, it is advantageous if the at least one reinforcing component and/or the at least one plate element consists of a metallic material and/or fiber-reinforced plastic and/or an organic sheet.

It is also advantageous if a textile planar semifinished product is integrated in the battery housing part, which semifinished product preferably comprises glass fibers and/or carbon fibers and/or metal fibers and/or metallic sputter-coated fibers.

Advantageous exemplary embodiments of the invention are shown simplified in the drawing and explained in more detail in the description which follows.

DESCRIPTION OF THE INVENTION

The exemplary embodiments shown in FIGS. 1 to 16 concern a battery housing part 1 which, in the exemplary embodiments, takes the form of a battery dish or battery trough, open at the top, with a housing base 3 and a peripheral flange-like housing wall 5 as an edge. This may however also be called a battery tray or battery box. To reduce the weight of the battery housing part 1, for a large part, thermoplastic or duroplastic is used as the material for the battery housing part 1. To form a closed battery housing part, the tray-like or dish-like battery housing part 1 may be provided with a cover, e.g. in the form of a deep drawn aluminum plate, and provided with a liquid sealant for sealing between these components.

As depicted in FIGS. 1 to 6, according to a first exemplary embodiment, to increase the stiffness and for protection of the battery housing part 1 in the event of a crash, frame-like reinforcing components 7 may be used. These reinforcing components 7 are made for example from an extruded profile of metal, preferably an alloy such as aluminum, by forming e.g. bending into a peripheral or closed frame, and then welded on the ends. Such a frame-like reinforcing component 7 makes a substantial contribution to increasing the stiffness of the battery housing part 1. Alternatively, the reinforcing components 7 may also be formed by individual part pieces which are connected together at their ends by welding or with intermediate elements. It would also be conceivable to divide the reinforcing components 7 in the form of a frame into two parts, so that the extruded profiles may be bent into a U-shape. It is however also possible to use rod-like, straight reinforcing elements 7.

Figure 1:
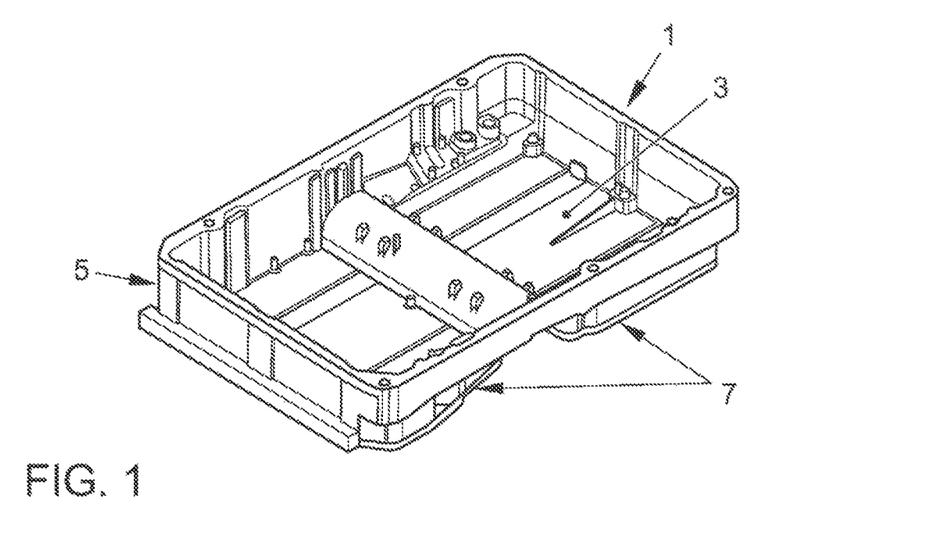
FIG. 1: a first exemplary embodiment of a battery housing part according to the invention with two frame-like reinforcing components.
Figure 2:
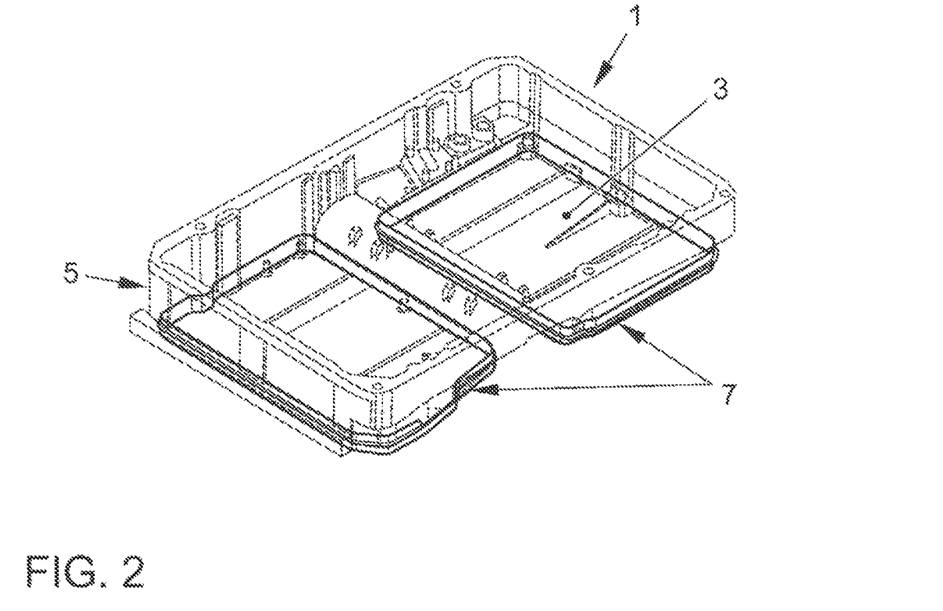
FIG. 2: a second depiction of the first exemplary embodiment of the invention with two frame-like reinforcing components, in which the battery housing part is shown partially transparent.
Figure 3:
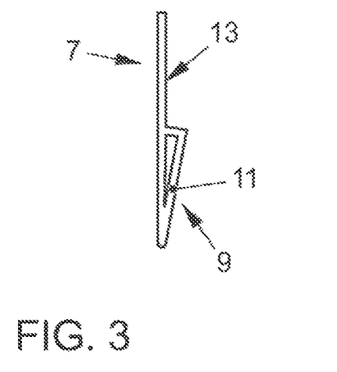
FIG. 3: a section view of a frame-like reinforcing component.
Figure 4:
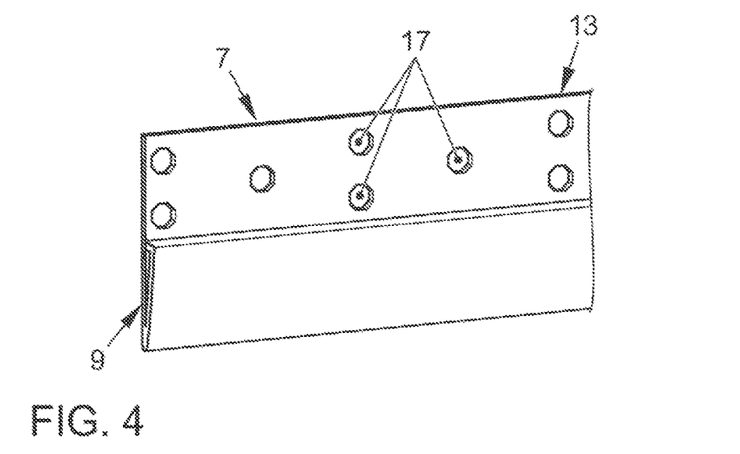
FIG. 4: a partial view of a frame-like reinforcing component.
Figure 5:
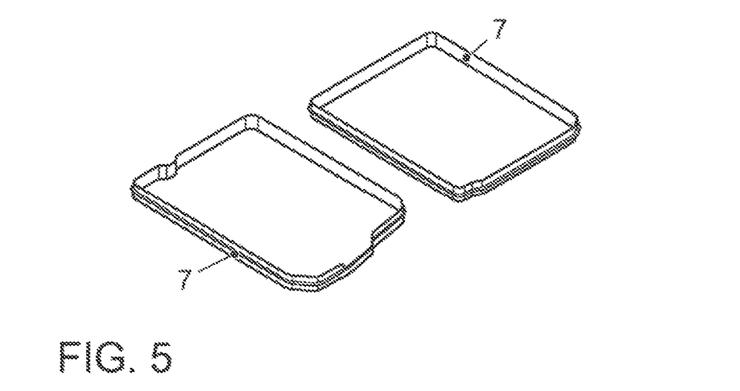
FIG. 5: two frame-like reinforcing components in a top view.
Figure 6:
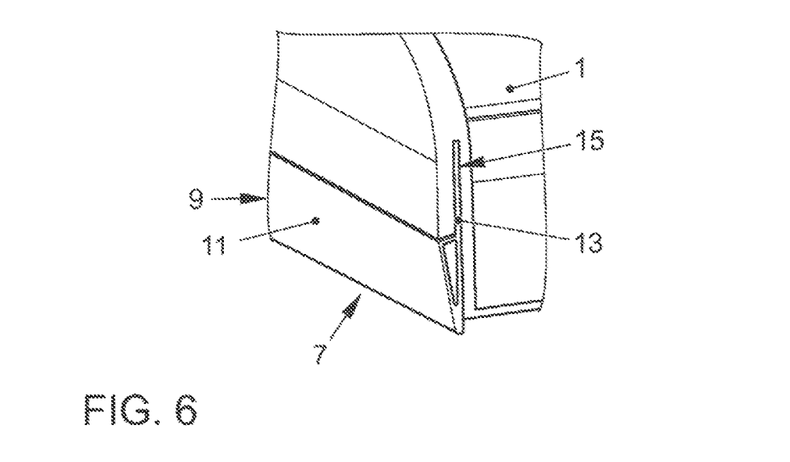
FIG. 6: a section view of a frame-like reinforcing component inserted in the battery housing part according to the invention.

To increase the mechanical stiffness of the battery housing part 1, in the exemplary embodiments depicted, the two frame-like reinforcing components 7 are preferably fixedly connected to the battery housing part 1. For this reason and in order to integrate the frame-like reinforcing components 7 well into the battery housing part 1 and give it a high stiffness, the reinforcing components 7—as shown in FIGS. 3, 4 a 6—have a triangular portion 9 with a chamfer 11 and a web portion 13 adjoining this. The form of the triangular portion 9 is intended to prevent damage to the battery housing 1 in the event of a side impact. As FIG. 6 shows, the triangular portion 9 of the frame-like reinforcing components 7 form an edge protection for the battery housing part 1. The reinforcing component is held with its web portion 13 in a corresponding peripheral groove 15 of the battery housing part 1.

FIG. 4 shows a partial view of a reinforcing component 7, formed for example from an extruded profile, with recesses 17 which are most easily formed e.g. by punching passage openings in the web portion 13. These recesses 13 serve to achieve a form-fit connection between the reinforcing component 7 and the plastic material of the battery housing part 1. If the battery housing part 1 is produced for example in an injection molding process, when plastic is spray-molded around the reinforcing components 7, plastic material flows into the recesses 17 and a form-fit connection is created on hardening.

Figure 7:
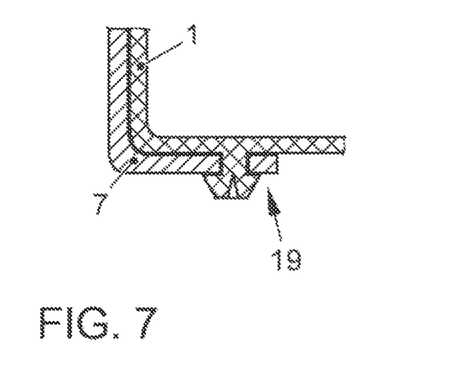
FIGS. 7 to 9: various arrangements for fixing a reinforcing component to the battery housing part.
Figure 8:
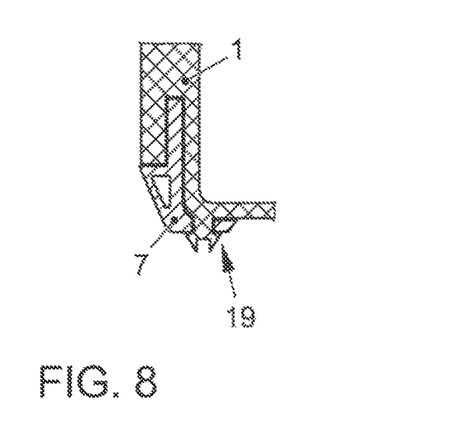
Figure 9:
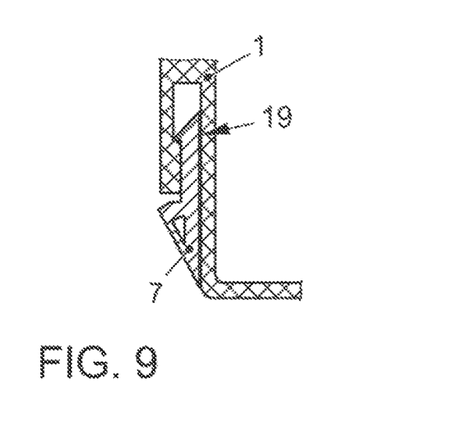
Figure 10:
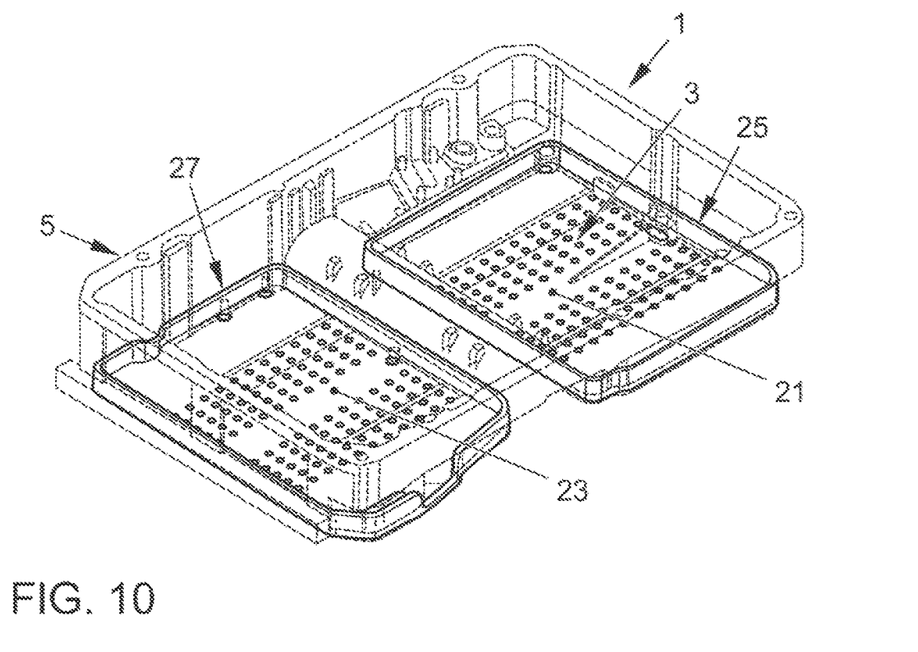
FIG. 10: a second exemplary embodiment of a battery housing part according to the invention with two substantially flat plate elements, in a partially transparent depiction.

Alternatively or additionally to the recesses 17 or passage openings on the web portion 13, the reinforcing component 7 may also be subsequently attached to the otherwise complete battery housing part 1 by means of clip connections 19. Exemplary embodiments of such clip connections 19 between the reinforcing component 7 and the battery housing part 1, in the form of press catches shaped as pushbuttons or other locking tabs, are shown in FIGS. 7 to 9, wherein other configurations are conceivable. It is also possible to fix the reinforcing component 7 onto the battery housing part e.g. by hot caulking.

It is also possible, instead of insertion and extrusion molding of the reinforcing component 7, first to create the battery housing part 1 and provide a groove 15 in the battery housing part 1 for the web portion 13 of the reinforcing component 7. The frame-like bent reinforcing component 7 may be inserted, with the web portion 13, subsequently in the groove 15 and fixed by substance bonding by adhesive or by form fit by screws, rivets etc.

A second exemplary embodiment of a battery housing part 1 according to the invention with two substantially flat plate elements 21 and 23 is depicted in FIGS. 10 to 13. To reduce the weight, the battery housing part 1 is again formed substantially from a thermoplastic. To increase the stiffness and to protect the battery housing part 1 in the event of a crash, for reinforcement planar plate elements 21 and 23 are used as part of the housing base 3 and for example each have a substantially peripheral web 25 or 27 and hence may also have a trough-like form. The plate elements 21 and 23 may e.g. be panels formed in a deep drawing process. The perforation of the plate elements 21 and 23 provided in FIGS. 10 and 12 serves, on production of the battery housing part 1 from a plastic and on extrusion molding of the plate elements 21 and 23, to create a form fit between the battery housing part 1 and the plate elements 21 and 23.

Figure 11:
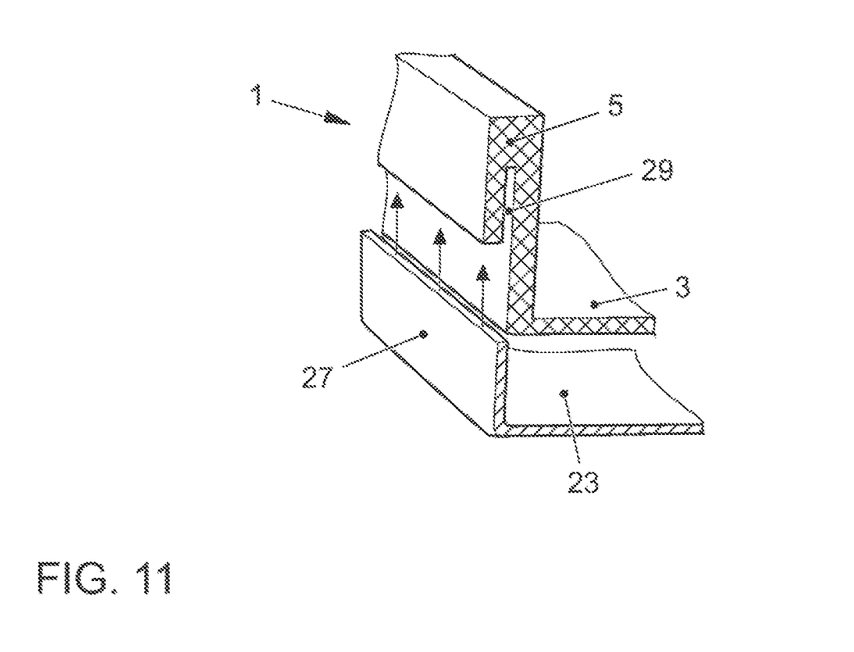
FIG. 11: a section view of the second exemplary embodiment according to the invention with a bonding connection of the battery housing part and plate element.
Figure 12:
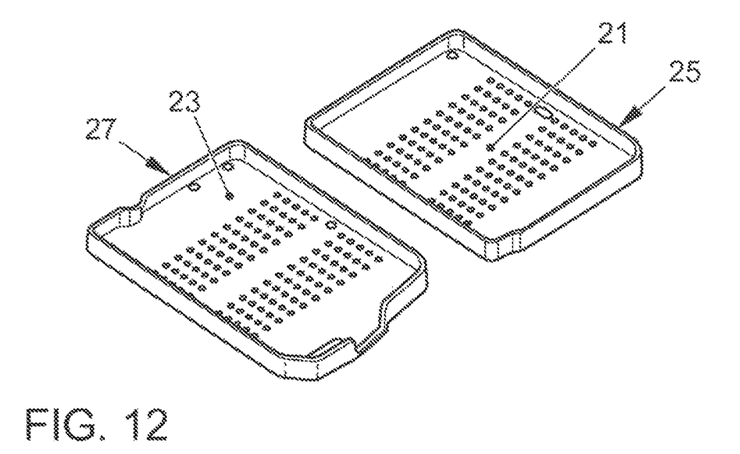
FIG. 12 and FIG. 13: exemplary depictions of plate elements in a top view.

It is also possible to connect the plate elements 21 and 23 subsequently to the battery housing part 1. To this end, it is possible to insert the plate elements 21 and 23 in the battery housing part 1 from above or —as shown in FIG. 11—connect these to the battery housing part 1 from below. A possible installation direction is indicated in FIG. 11 by arrows. For this for example, a peripheral recess 29, formed annular relative to the battery housing part 1 and groove-like in cross-section, is provided in the region of the housing base 3 of the battery housing part 1. In this case, the plate elements 21 and 23 may be connected to the battery housing part 1 e.g. by substance bonding by adhesive or by form fit e.g. by pins, rivets, screws and other fixing means.

For sealing reasons, it is advantageous to provide a closed plastic surface in the interior of the battery housing part 1. To stiffen the battery housing part 1—also in all exemplary embodiments according to the invention depicted—beads, ribs or other stiffening measures may suitably be molded onto the housing base 3.

Figure 13:
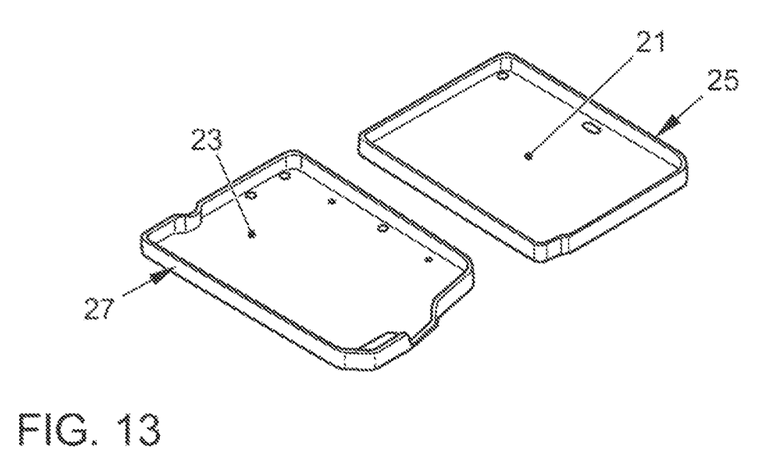

As depicted in FIG. 13, alternatively the plate elements 21 and 23 may be made of organic sheet or another planar textile semifinished product. These may be integrated in the housing base 3 of the battery housing part 1 in the same manner as described.

Organic sheets are fiber matrix semifinished products which consist of a fiber woven or laid fabric embedded in a thermoplastic matrix. The advantages of a thermoplastic matrix lie in the hot-moldability of the semifinished product and the resulting short process times. Fiber materials frequently used are glass, aramide and carbon. For woven and laid fabrics, the fibers may also run at right angles to each other so that the mechanical properties of organic sheets, such as stiffness, strength and thermal expansion, may be better than those of metallic plates.

It is particularly advantageous if the organic sheet is formed as a matrix material from the same or a similar plastic as the housing component 1 formed later e.g. in the injection molding process. In this way, a substance bonding occurs on molding, so that tightness requirements can easily be fulfilled and the base region of the battery housing part 1 need not be filled by further plastic material. Following this concept, it is even possible to create by molding only the peripheral housing wall 5 of the battery housing part 1 and the connections to the organic sheet. If such a flat spray-molding of the housing base 3 is omitted, an injection molding machine with low closing force may be used. This reduces the need for resources and energy.

Figure 14:
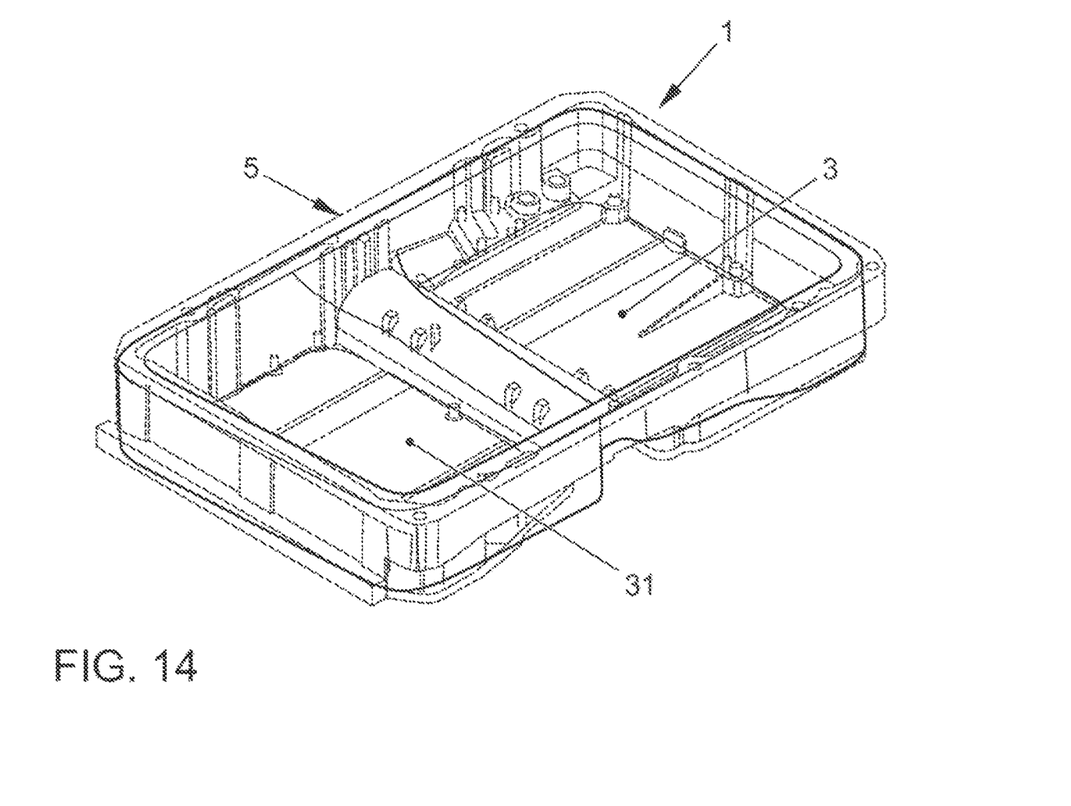
FIG. 14: a third exemplary embodiment of a battery housing part according to the invention with an integrated textile planar semifinished product in partially transparent depiction.
Figure 15:
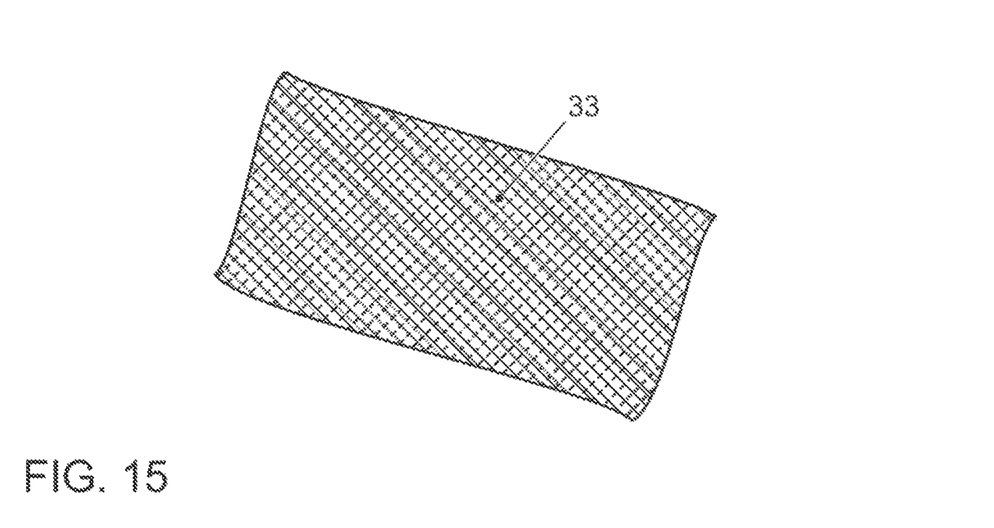
FIG. 15: a textile planar semifinished product.
Figure 16:
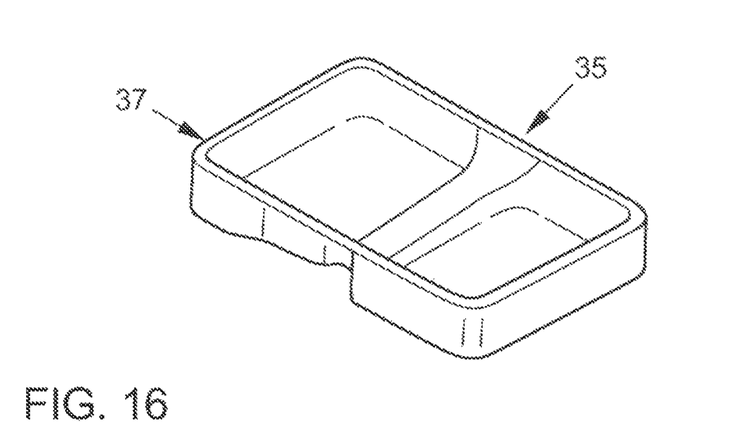
FIG. 16: a textile planar semifinished product molded into a molded body.

A third exemplary embodiment of a battery housing part 1 with an integrated textile planar semifinished product 31 is depicted in FIGS. 14 to 16.

The textile planar semifinished product 31 is for example—as shown in FIG. 15—a laid or woven fabric 33 made of glass fibers, carbon fibers, metal fibers, metallic sputter-coated fibers or similar. In the exemplary embodiment, this laid or woven fabric 33 shown is first subjected to a forming process, e.g. a pressing process, in which—as shown in FIG. 16—a molded body 35 with a peripheral edge 37 can be formed. In the subsequent production of the battery housing part 1, the molded body 35 is laid in a tool and sprayed with plastic material. In this way, a molded body 35 consisting of a laid or woven fabric 33 of fibers is integrated in the battery housing part 1. Particular advantages in this exemplary embodiment of the invention are, as well as increasing stiffness, the improved impact toughness and implementation of EMC (electromagnetic compatibility) protection, e.g. from the use of metal fibers or metallic sputter-coated fibers.

In principle however, a sputter coating of the housing component 1 with a metal to ensure adequate EMC protection is also possible.

The peripheral edge 37 of the molded body 35 may however also be created in a subsequent process e.g. by primary forming.

The present invention includes the combination of any features disclosed in the description, the claims and the figures.

LIST OF REFERENCE SIGNS

1 Battery housing part
3 Housing base
5 Housing wall
7 Frame-like reinforcing component
9 Triangular portion
11 Chamfer
13 Web portion
15 Groove
17 Recess
19 Clip connection
21 Plate element
23 Plate element
25 Web
27 Web
29 Recess
31 Planar semifinished product
33 Laid or woven fabric
35 Molded body
37 Edge

The invention claimed is:

1. A battery housing part for a traction battery of an electric or hybrid vehicle, the battery housing part comprising:
a first partial region of the battery housing part formed of a plastic material; and
at least one second partial region of the battery housing part formed of a material different from said plastic material of said first partial region;
a reinforcing component disposed on at least a portion of a periphery of the battery housing part, said reinforcing component consisting of a different material from said plastic material of said first partial region, said reinforcing component being a frame surrounding at least a portion of the periphery of the battery housing part, said reinforcing component being molded into the battery housing part, said reinforcing part having a cross section with a triangular portion with a chamfer and a web portion adjoining said triangular portion.

2. The battery housing part according to claim 1, wherein said reinforcing component is formed of an extruded profile.

3. The battery housing part according to claim 1, wherein said reinforcing component is mechanically connected on the battery housing part by way of a mechanical connection.

4. The battery housing part according to claim 1, which comprises at least one substantially flat plate element that consists, at least partially, of a material different from said plastic material of said first partial region.

5. The battery housing part according to claim 1, which comprises at least one reinforcing component disposed on at least a portion of a periphery of the battery housing part and at least one substantially flat plate element, wherein said at least one reinforcing component and/or said at least one plate element consists of a material selected from the group consisting of a metallic material, a fiber-reinforced plastic, and an organic sheet.

6. The battery housing part according to claim 1, which comprises a textile planar semi finished product integrated in the battery housing part.

7. The battery housing part according to claim 6, wherein said textile planar semi finished product comprises fibers selected from the group consisting of glass fibers, carbon fibers, metal fibers, and metallic sputter-coated fibers.

8. A battery housing of a traction battery of an electric or hybrid vehicle, the battery housing comprising at least one battery housing part according to claim 1.

9. A battery housing part for a traction battery of an electric or hybrid vehicle, the battery housing part comprising:
a first partial region of the battery housing part formed of a plastic material; and
at least one second partial region of the battery housing part formed of a material different from said plastic material of said first partial region;
a reinforcing component disposed on at least a portion of a periphery of the battery housing part, said reinforcing component consisting of a different material from said plastic material of said first partial region, said reinforcing component being a frame surrounding at least a portion of the periphery of the battery housing part, said reinforcing part having a cross section with a triangular portion with a chamfer and a web portion adjoining said triangular portion.

* * * * *